May 19, 1931.  E. H. BRISTOL  1,805,971
CONTROLLING MECHANISM
Filed April 11, 1928
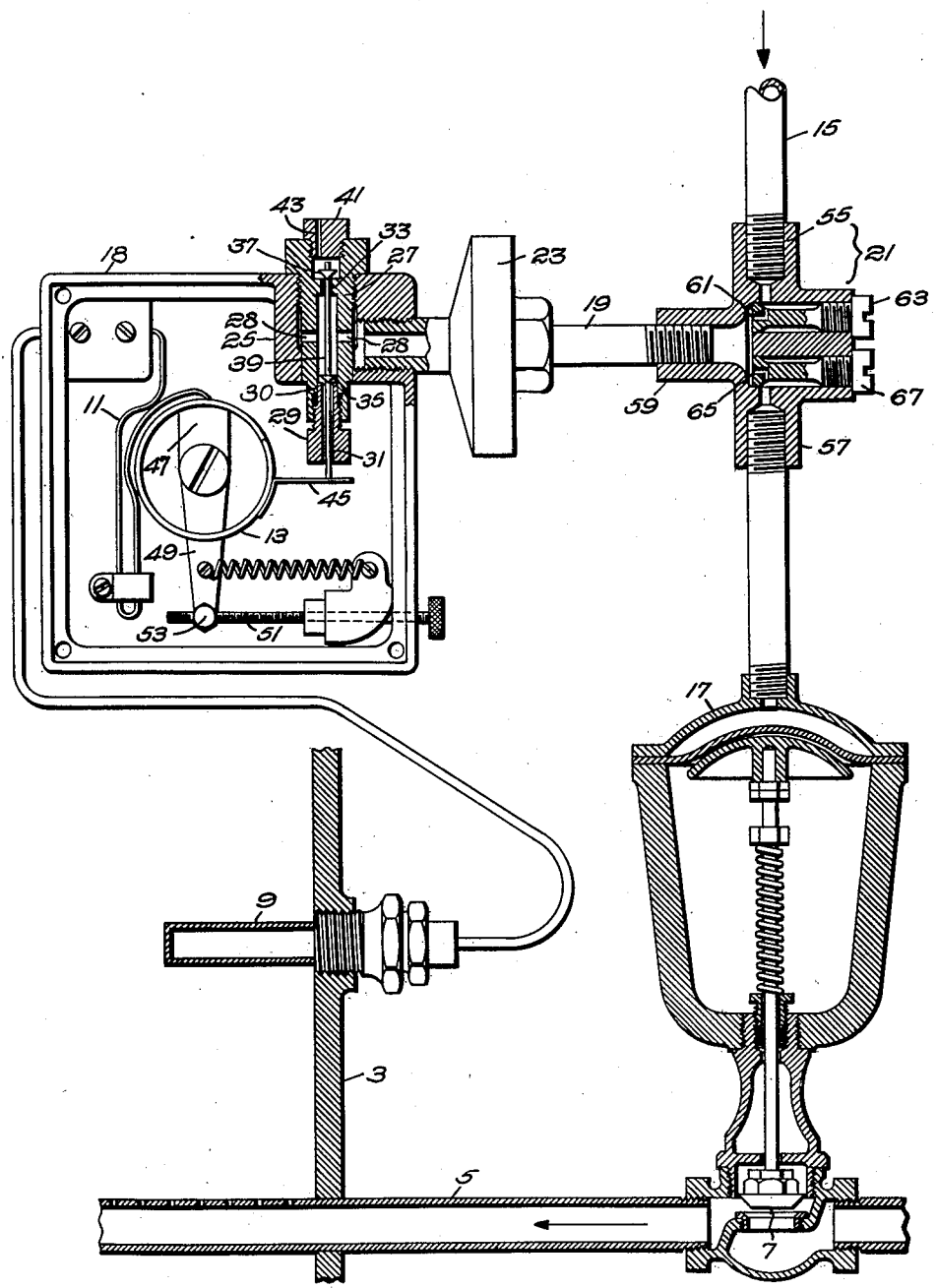
Inventor
Edgar H. Bristol
by Emery, Booth, Janney & Varney
Attys Patented May 19, 1931

1,805,971

UNITED STATES PATENT OFFICE

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS

CONTROLLING MECHANISM

Application filed April 11, 1928. Serial No. 269,257.

This invention relates to controlling instruments in which the supply of fluid under pressure (positive or negative) to same mechanism to be controlled is governed by a suitable responsive device, such, for example, as a vapor tension thermometer. The object of the invention is to provide a simple, durable and sensitive device of this type.

My invention will be well understood by reference to the following description of an illustrative embodiment thereof taken in connection with the accompanying partly diagrammatic drawing showing an installation embodying a controller illustrative of my invention, parts being in vertical section.

In the exemplary application of my invention herein shown I have illustrated the wall 3 of a chamber such as a vat, vulcanizer or the like, to which steam is supplied through pipe 5 under the control of a valve 7. A thermometer bulb 9 projects into the chamber and is connected by a suitable capillary tube 11 to a suitable responsive device 13, herein shown as a helical Bourdon tube. The movements of the tube 13 in accordance with the fluctuations of the temperature control through the mechanism to be described the supply of compressed air through a line 15 to a diaphragm motor 17 which operates the valve 7. Installations of this general type are well known and the installation which has just been described is by way of example merely.

The controlling instrument proper, including the responsive device 13, may conveniently be organized in a suitable case 18 placed at any convenient location and connected to the pressure line by suitable piping connections, herein comprising the pipe 19 making connection with a fitting 21 interposed in the pressure line 15. In the drawing the front or cover of the case 18 is removed to show the interior and a part is broken away and shown in vertical section.

Herein the pipe 19, in which may be interposed a suitable strainer 23, enters a valve chest 25 forming a portion of the case. The valve chest is provided with openings at opposite sides, one preferably opening to the exterior of the case, which openings are adapted to receive a valve casing 27 of generally cylindrical form which may be passed through the openings from the exterior of the case to the position indicated and which is conveniently provided with threads as shown at the upper end thereof whereby it may be screwed in position in the wall of the valve chest 25. Openings 28 in the walls of the valve casing place the interior thereof in communication with the interior of the chest. The valve casing is so designed that when screwed into the chest the lower cylindrical portion thereof makes an air-tight joint with the lower opening in the chest. When in position the valve casing is preferably vertical, as shown, for a purpose which will appear. The lower end of the casing 27 may be closed by a plug 29 screwed into the casing and having a cylindrical end 30 snugly fitting the bore of the casing. Plug 29 has a central passage 31 constituting an exhaust port communicating with the interior of the case 18, the upper end of the passage providing a valve seat. Adjacent the upper end the casing 27 may be restricted to provide a passage 33 constituting an exhaust port opening to the exterior and provided with a valve seat at the upper side thereof. Cooperating with these seats is a suitable double valve comprising the lower and upper valve heads 35 and 37 carried by the stem 39. This valve may be assembled by first securing head 35 on the stem and then placing it in the valve casing and screwing or pressing the head 37 into position on the stem to cooperate with its seat. The adjustment of the seat for the head 35 provided for by the threaded assembly of the plug 29 with the casing permits the proper seating of both parts of the double valve. The provision of the cylindrical portion 30 permits such adjustment while maintaining alignment and an air-tight connection between the plug and the casing. Herein a threaded plug 41 having a vent or leak 43 out of line with the valve stem prevents undue movement of the valve upwardly such as might permit the lower portion of the stem which normally loosely projects through and is guided in the bore 31 to be displaced bodily from such bore.

The valve just described functions as a balanced construction, and may be so designed that the areas at both exits are substantially equal. If necessary, the upper port may be made slightly larger than the lower so that a portion of the weight of the valve may be compensated for by the difference in port areas. It will be seen that this valve is freely floating, normally resting under gravity on its seat, and that it may be lifted without overcoming any substantial resistance other than its very light unbalanced weight by the direct mechanical operation of the helical tube 13 on the projecting end of the stem 31, this herein being shown as effected by means of a leaf 45 connected to the free end of the helical tube. The point at which the helical tube begins to move the valve may be adjusted by mounting the latter on a rotatable base 47 having an arm 49 adapted to be moved by an adjusting screw 51 entering from the exterior of the case and tapping into a small nut 53 swivelled on the end of the arm. To facilitate this adjusting movement the capillary tube 11, which leads to the tube 13, may be looped as shown at the left of the figure to provide suitable slack.

Disregarding for the time being the construction of the fitting 21, the operation of the controlling mechanism may be described as follows. In the position of the parts shown the valves 35 and 37 are supported away from their seats by the leaf 45 and then the pressure in the line 13 is leaking through the exhaust ports at 31 and 33 in casing 27, the diaphragm chamber of the motor 17 is in connection with the atmosphere and the valve 7 stands open and steam is flowing through pipe 5. Now, if the temperature rises, the helical tube 13 will operate to withdraw leaf 45 from the stem of the controlling valve permitting the latter to drop under gravity, closing the exhaust ports, and pressure will build up in the line and the diaphragm of the motor will be forced downwardly, closing the controlled valve 7. If the chamber cools down, the helical tube 13 will contract, the control valve will be lifted, opening the exhaust ports, and the pressure will gradually drop in the line 15, permitting valve 7 again to be opened.

The supply of compressed air and the source thereof in the controlling mechanism and diaphragm motor is preferably through a restricted bleeding passage so that a volume of air will not pass which cannot be efficiently cared for by a small and delicate control valve to obtain the desired control of pressure by means of the latter. Preferably also the exhaust from the diaphragm motor is effected through a similar restricted passage in order to govern the rate of the closing movement of the control valve 7. Provision for effecting this may conveniently be effected by means of mechanism organized in the connecting fitting 21, as herein disclosed. This fitting 21 is essentially a Y embodying a branch 55 from the source of supply, a branch 57 to the diaphragm motor 17 and a branch 59 to the controller. Communication from the branch 55 may be through a restricted bleeding passage 61, herein giving into branch 59, which opening is here shown as in the end of a removable plug 63 adapted to be screwed into the fitting from the exterior thereof and the end of which forms a wall within the body of the fitting between the branches 55 and 59. The passage 61 may open axially through the end of the plug which forms this wall to branch 59 and have a lateral extension opening to branch 55. Since in the example shown the plug 63 is screwed into position, it would not be easy to determine whether this lateral extension of the passage were pointed directly toward the bore of branch 55 as is illustrated. Consequently the extension conveniently opens to a reduced portion of the plug as shown, permitting communication between the passage and the bore of branch 55 irrespective of the angular orientation of the plug. Communication from the branch 57 (herein into branch 59) may be through the restricted bleeding passage 65 of a similar plug 67.

The size of the passages 61 and 65 may be widely varied in accordance with the conditions of use. To give a single example I have for certain practical conditions utilized openings having a diameter of about .020 of an inch.

The arrangement shown, wherein the plugs 63 and 67 are inserted from the exterior, permits them to be readily removed and other similar plugs having openings of different size substituted when desired. An important feature of my invention is the provision of means whereby the lag of the control valve 7 may be varied, this herein being effected by utilizing a plug 67 having a bleeding passage 65 of desired size, thus to control the speed at which the pressure in the diaphragm motor may exhaust therefrom.

In order to illustrate my invention I have disclosed an installation wherein the mechanism operated by the compressed air supply is a diaphragm motor operating a valve controlling the supply of a heating fluid and wherein the variable governing the controlling instrument is temperature, but this is obviously not essential and the controlling mechanism might be applied to many other uses. I have herein described the mechanism, such as the diaphragm motor 17, as being operated by fluid under positive pressure, but obviously sub-atmospheric or negative pressure might be utilized in some installations and in this case the so-called exhaust valves of the controller would serve to place the main pressure line or vacuum line in communication with the atmosphere when open, and they would, of course, open the other way.

In the arrangement shown a practically balanced control valve is provided which may be readily operated directly by responsive mechanism of small power capacity such as the helical tube 13 and the control of pressure through restricted passage 61 further permits the valve to be made light and small. It may be freely floating as shown, gravitating to its seat without packed joints, which would cause a resistance to its free operation, and without utilization of any springs or parts subject to fatigue.

The mechanical construction shown constituting subsidiary features of the invention, such as the valve chamber, which is easily removable and easily replaceable, and the control fitting 21 offer obvious advantages for practical use.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. In a controlling apparatus a supply line receiving pressure fluid from a source thereof, a delivery line therefor leading to a mechanism to be operated thereby, a valve casing adapted to receive fluid from said lines having an exhaust port, a valve for the exhaust port, a device responsive to the fluctuations of a variable for moving said valve and thereby controlling pressure conditions in said delivery line, said supply line comunicating with said casing and delivery line through a restricted bleeding opening, and a readily removable and replaceable element having a restricted bleeding opening and adapted to control the rate of exhaust from the delivery line.

2. The constituent of a controlling apparatus of the class described, an essentially Y-shaped fitting providing for its connection to a supply line, a delivery line to a mechanism to be operated and to an exhaust valve casing, said fitting embodying a bleeding passage to restrict the flow of fluid therethrough from said supply line.

3. The constituent of a controlling apparatus of the class described, an essentially Y-shaped fitting providing for its connection to a supply line, a delivery line to a mechanism to be operated and to an exhaust valve casing, said fitting embodying a bleeding passage to restrict the flow of fluid therethrough from said supply line, and a readily removable member having a restricted passage for controlling exhaust from said delivery line.

4. The constituent of a controlling apparatus of the class described, an essentially Y-shaped fitting providing for its connection to a supply line, a delivery line to a mechanism to be operated and to an exhaust valve casing, said fitting embodying restricted bleeding passages for controlling respectively the flow from the supply line to delivery line and valve casing and the exhaust flow between delivery line and valve casing.

5. The constituent of a controlling apparatus of the class described, an essentially Y-shaped fitting providing for its connection to a supply line, a delivery line to a mechanism to be operated and to an exhaust valve casing, and removable plugs insertable from the sides thereof and closing the passageways of the fitting, said plugs having restricted openings providing bleeding passages for controlling respectively the flow from the supply line to delivery line and valve casing and the exhaust flow between delivery line and valve casing.

6. The constituent of a controlling apparatus of the class described, an essentially Y-shaped fitting providing for its connection to a supply line, a delivery line to a mechanism to be operated and to an exhaust valve casing, said fitting embodying a bleeding passage restricting the flow from the supply line therethrough and a removable plug insertable from the side of the fitting closing a passage from the delivery line and having a bleeding passage to restrict the exhaust flow therefrom.

In testimony whereof, I have signed my name to this specification.

EDGAR H. BRISTOL.